June 16, 1953   F. W. WEHMILLER ET AL   2,642,173
DEVICE FOR TRANSFERRING TRAVELING ARTICLES
Filed June 27, 1949   5 Sheets-Sheet 1

FIG. 1.

INVENTORS
FREDERICK W. WEHMILLER
WILLIAM J. NEKOLA
BY Albert J. McCauley
ATTORNEY June 16, 1953 F. W. WEHMILLER ET AL 2,642,173
DEVICE FOR TRANSFERRING TRAVELING ARTICLES
Filed June 27, 1949 5 Sheets-Sheet 5

INVENTORS
FREDERICK W. WEHMILLER
WILLIAM J. NEKOLA
BY *Albert J. McCauley*

ATTORNEY

Patented June 16, 1953

2,642,173

UNITED STATES PATENT OFFICE 2,642,173

DEVICE FOR TRANSFERRING TRAVELING ARTICLES

Frederick W. Wehmiller, Ladue, and William J. Nekola, Normandy, Mo., assignors to Barry-Wehmiller Machinery Company, St. Louis, Mo., a corporation of Missouri Application June 27, 1949, Serial No. 101,652

16 Claims. (Cl. 198—30)

This invention relates to devices for transferring traveling articles, and more particularly to an accumulator comprising a rotary table having one or more peripheral inlets to receive the traveling articles, and one or more peripheral outlets to discharge said articles, the articles being carried by the rotary table from said inlet or inlets to said outlet or outlets.

One advantage of the invention appears in the transfer of a continual stream of articles from one machine to another, while providing for accumulation of excess articles on the rotating table, and eventual return of such excess articles to a zone near a peripheral inlet, or to a peripheral outlet. For example, when one machine is feeding articles to another machine at an approximately predetermined rate per minute, and the receiving machine has a capacity which enables it to act upon the articles at the approximately predetermined rate, there may be an abnormal discharge of excess articles from the first machine. In this event, the excess articles are free to accumulate on the rotary table which returns them to the inlet, or delivers them to a peripheral outlet of the table, as will be hereafter described.

Another advantage appears in the selective delivery of a continual stream of articles from the peripheral inlet of the rotary table to a plurality of peripheral outlets. For example, a machine having a relatively high capacity per minute may discharge the traveling articles for operations in a plurality of machines, each having a relatively low capacity per minute. As a specific illustration of this point, we may refer to a machine for pasteurizing beer at the rate of approximately 200 bottles per minute, for delivery to the peripheral inlet of the rotary table, and assume that one peripheral outlet of the table leads to a labeling machine requiring approximately 125 bottles per minute, while the other peripheral outlet is for a labeling machine normally requiring about 75 bottles per minute.

In this event, the rotary table will distribute the bottles at the predetermined rates through its peripheral outlets. This involves an overflow from one outlet to another, and preferably a return of excess bottles to the inlet portion of the rotary table.

It is usually possible to transfer bottles and other articles from one machine to another at an approximately uniform rate per minute. However, in actual practice, the machine from which the articles are supplied may deliver too many or not enough for the normal demands of a receiving machine, or machines. In other cases, a receiving machine may be stopped for an emergency and therefore unable to receive any of the traveling articles.

During normal operating conditions, when there are only a few excess articles due to natural variations in the approximate capacities of the machine, these excess articles may be automatically returned by our rotary table without in any way interfering with the companion machines. However, when a receiving machine is stopped on account of a broken bottle, or a broken part of the machine, or for any other reason, the excess articles can merely accumulate on the rotary table for future delivery when normal operations are resumed. In actual practice we have found that such stoppage is most likely to be for a very brief period, and that the speed of the receiving machine, or machines, can be temporarily increased to dispose of the excess articles on the rotary table.

Other features of the invention appear in adjustable baffle gates movable to vary the widths of peripheral outlets for articles of different diameters, and also adjustable to close one or all of the outlets.

The invention preferably includes a normally stationary returning baffle located above the rotary table in a line directed toward the periphery thereof, so as to deflect and return excess articles from the outlets to a zone near the peripheral inlet.

Other desirable conditions appear in adjustments which enable the rotary table to merely serve as an emergency accumulator for a stream of articles which normally travels at one side of the table. In this illustration, the excess articles may be discharged through one of the peripheral outlets, or returned to the inlet of the rotary table for future delivery to the traveling stream.

The rotary table herein disclosed is adapted to receive an irregular mass of crowded articles from a traveling supply conveyor, and transfer said articles one at a time to traveling delivery conveyors leading from peripheral outlets of the table.

A further advantage appears in the fact that the machine is adapted to be set to receive a plurality of streams of incoming articles through a plurality of peripheral inlets, with the result of combining the streams and discharging the articles in a single stream through a peripheral outlet.

With the foregoing and other objects in view, the invention comprises the specific combination and arrangement of details herein disclosed, However, it is to be understood that the scope of the invention extends to numerous variations and modifications, more broadly described by the claims hereunto appended.

Fig. 12 designates a suitable rotary table having a smooth horizontal top surface, and a central hub 13 (Fig. 9) at the bottom to receive a stationary vertical post or shaft 14, the latter being fixed to a stationary sleeve 15 attached to a stationary base column 16. The table 12 is to be rotated about the vertical axis of the stationary shaft 14.

Suitable traveling conveyors are preferably associated with the rotary table to supply the articles to said table and to transmit the articles away from peripheral outlets of the table. For example, in Fig. 1 we have diagrammatically shown a group of traveling conveyor elements 17 arranged to form a supply conveyor leading to a peripheral inlet of the table 12, and a plurality of delivery conveyors 18 and 19 located in separate paths leading from peripheral outlets of the table to provide for distribution of the traveling articles. The top surfaces of these traveling conveyor elements 17, 18 and 19 may be horizontal and approximately flush with the top surface of the rotary table 12 (Fig. 9), so that the traveling articles can freely pass through the inlet and outlets of the table.

The traveling articles 20, shown by dotted lines, may be regarded as upright bottles, jars, cans, or any other selected articles, to be loosely seated on top surfaces of the table and conveyors.

The supply conveyor elements 17 travel in paths adjacent to a peripheral inlet of the rotary table. As a suitable means for directing the loose articles into said inlet, we have shown inclined deflecting baffle members 21 and 22 extending over the conveyor elements 17, and leading to said inlet. These baffle members are located in the paths of the traveling articles on the conveyor elements 17 to deflect said articles onto a peripheral portion of the rotary table 12.

Figure 1:
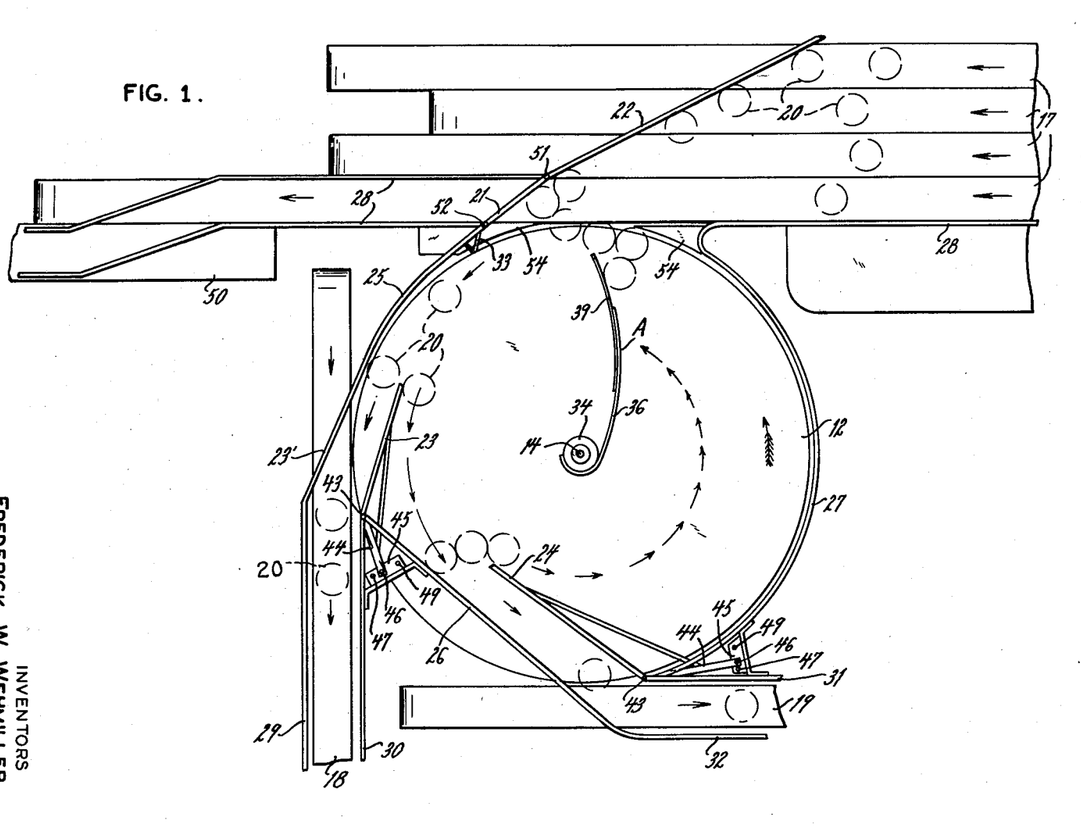
Fig. 1 is a diagrammatical top or plan view of a transferring device embodying features of this invention, showing conditions wherein the rotary table has a single inlet and two outlets.

As a suitable means for transferring the articles from the rotary table to the traveling conveyors 18 and 19 we have shown normally stationary deflecting baffles 23 and 24 adapted to extend over the table at paths of the traveling articles. These deflectors 23 and 24 may be arranged as shown in Fig. 1 to provide separate outlets leading from the rotary table to the traveling conveyors 18 and 19 respectively. The table may be provided with suitable guard rails, or fences, 25, 26 and 27, and similar guard rails 28, 29, 30, 31 and 32 may be located adjacent to the traveling conveyors.

The rotary table and the conveyors may be operated at any desired speeds. For example, under conditions suggested by Fig. 1, the delivery conveyors 18 and 19 may lead to separate machines for applying labels to bottles, while the supply conveyor elements 17 may receive a large mass of bottles to be distributed to the labeling machines. In this event, the speed of the delivery conveyors 18 and 19 will be sufficient to supply the labeling machines (not shown) with bottles at a rate conforming to the capacity of each labeling machine. If one labeling machine has a higher capacity than the other, the conveyors 18 and 19 may travel at different speeds so as to distribute the bottles to the different machines. The incoming bottles on the supply conveyor elements 17 are then delivered to the rotary table 12 at a rate conforming approximately to the combined capacities of the separate labeling machines.

As a more specific illustration, we have discharged bottles from a pasteurizing machine (not shown) to the conveyor elements 17 at a rate of about 200 bottles per minute, so as to feed different labeling machines one receiving 125 per minute, while the other receives 75 per minute. The incoming upright bottles on the supply conveyor elements 17 may appear in straight lines, or in the form of an irregular jumbled mass. However, the upright outgoing bottles are usually crowded together in lines extending along the traveling conveyors 18 and 19 and also in the outlet passages at the deflecting baffles 23 and 24. In this specific example, each labeling machine is provided with a reserve supply of incoming bottles crowded together in a continuous line extending from the entrance end portion of a deflecting baffle 23 or 24 to the discharge end of a delivery conveyor 18 or 19, where the bottles are delivered to the labeling machine at a rate conforming to the capacity of said machine.

Since the bottles are loosely seated on the rotary table 12 and traveling conveyors 18 and 19, it will be observed that said table and conveyors can move at relatively high speeds while slipping across bottom faces of the bottles, and such slippage frequently occurs at the reserve supply of crowded bottles extending from each outlet of the rotary table 12 to the discharge end of a delivery conveyor 18 or 19. Under such conditions, the bottles can be discharged from the delivery conveyors 18 and 19 at rates corresponding to the capacities of the labeling machines.

In Fig. 1, the incoming articles are deflected along the baffle 21 and thence onto a peripheral portion of the rotating table 12 which carries them toward an outlet passage between the inclined deflecting baffle 23 and an inclined wall member 23', so as to keep this outlet passage approximately full of articles. When said passage is clogged, or completely full of articles, the excess articles will pass the inlet end of the baffle 23 and travel toward a second outlet between the inclined deflecting baffle 24 and an inclined wall member 26, so as to keep said second outlet approximately full of articles. When this second outlet is completely filled with articles, the excess will overflow near the inlet end of the baffle 24 and continue in motion with the rotary table.

A continual stream of articles is thus delivered to peripheral portions of the rotary table and distributed through a plurality of peripheral outlets, each outlet receiving the articles at a predetermined rate per minute, depending upon the rate at which the articles are permitted to pass through the outlet.

As a detail in Fig. 1 it will be observed that the excess articles overrunning or overflowing from the first outlet passage contact with a preceding article at the entrance of said passage, which deflects said excess articles a slight distance away from the periphery of the rotating table. However, the inlet end of the baffle 24 is more remote from said periphery than the inlet end of the baffle 23. As a consequence, excess articles deflected away from the first outlet passage will be carried on the rotary table in an arcuate line leading to the second outlet.

In actual practice, the supply of articles to the rotary table may frequently exceed the demands of machines to which the articles are distributed. In this event, excess articles overflowing from the second, or final, outlet passage are free to accumulate on the rotary table, and they may be returned to the inlet end of the table for future delivery to the outlet passages. As an illustration of a suitable means for deflecting excess articles toward the periphery of the table, we have shown a normally stationary deflecting baffle A having a curved abutment face extending from a point near the axis of the table in a line directed toward the periphery thereof. The outer end of this baffle A may be located in a zone near the inlet of the rotary table as shown in Fig. 1, so as to deflect excess articles to said inlet, where they are ready to mix with the incoming streams of articles. The excess articles are free to accumulate on the rotary table until they are eventually discharged through one of the outlets.

Under normal conditions the rotary table and traveling conveyors in Fig. 1 are operated constantly at selected speeds to distribute the incoming stream of articles to a plurality of constantly running receiving machines (not shown) which are fed by the delivery conveyors 18 and 19. However, an emergency condition will occur when one of the receiving machines is suddenly stopped, due to a broken bottle, or for some other reason. The supply of articles 20 on one of the delivery conveyors 18 or 19 will then be unable to travel away from the rotating table. Assuming that an emergency of this kind prevents the discharge of articles through the outlet passage at the baffle 23 in Fig. 1. Excess articles will then accumulate on the large rotary table 12. A line of incoming articles may be crowded against the curved portion of the guide rail 25 near the entrance of the clogged outlet passage, but most of the incoming articles will be gently deflected inwardly away from the periphery of the table, without danger of breakage, and without stopping the normal delivery of articles through the outlet passage at the baffle 24.

As a relatively minor detail, the deflector at the inlet of the table may be provided with an inwardly projecting cam 33 (Fig. 1) which aids in deflecting incoming articles away from a line of articles that may be crowded against the curved guide rail 25 when the adjacent outlet passage is clogged.

Emergency stopping of a receiving machine for very brief periods occur more or less frequently, and in such cases all of the excess articles can accumulate on the large table without excessive or dangerous crowding. At this time, the speed of the active receiving machine may be increased, and when the idle machine is again started its speed may be temporarily increased to dispose of accumulated articles on the rotating table.

In describing the arrangement of details shown in Fig. 1, we have assumed that the delivery conveyors 18 and 19 lead to constantly running machines for performing operations on the traveling articles. However, except as specified in the claims, the invention is not in any way limited to operations that may be performed at the articles after they are discharged from the rotary table. The arrangement shown in Fig. 1 could be employed to deliver articles at a predetermined rate to the delivery conveyor 18, while the conveyor 19 is employed to merely carry away the excess articles.

Figures 7, 8:
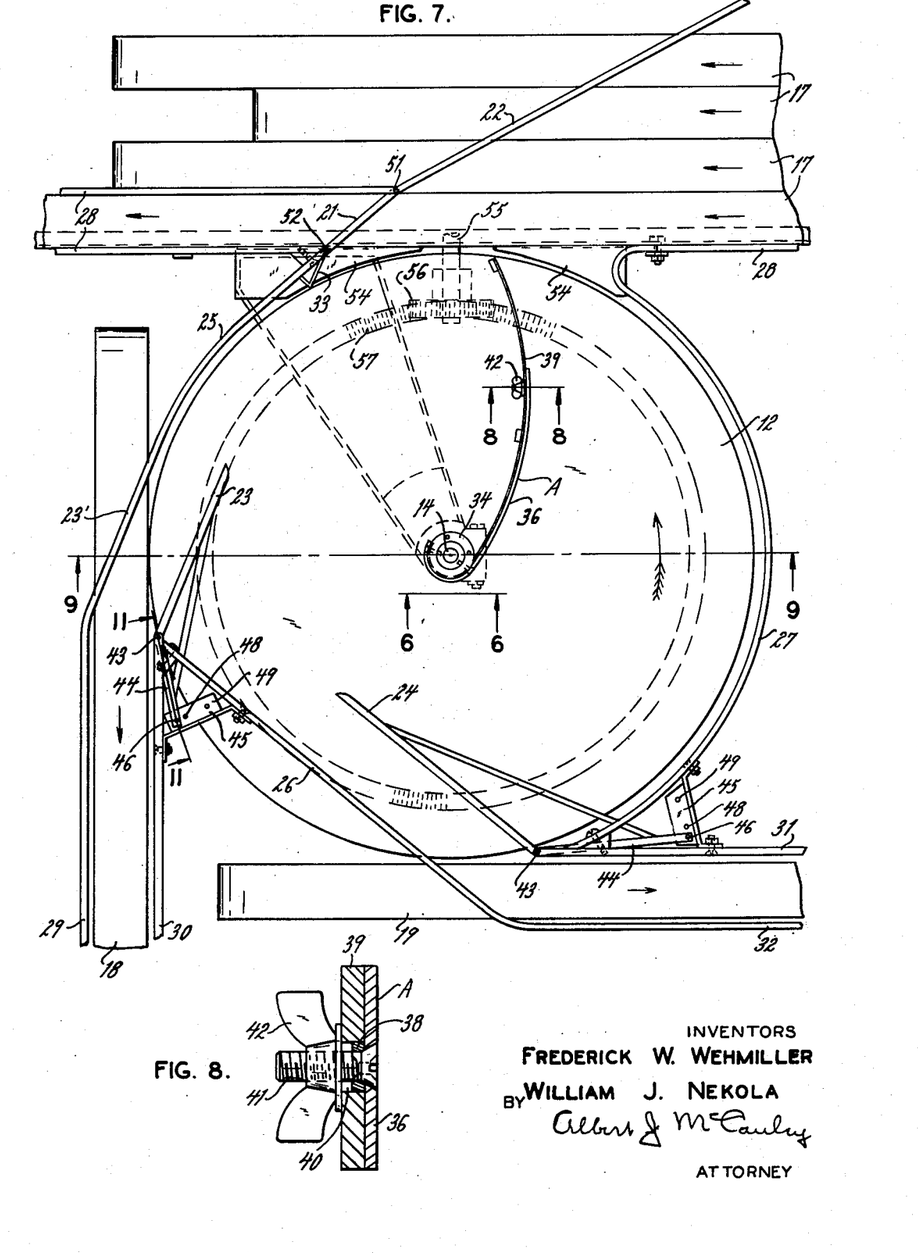
Fig. 7 is top or plan view illustrating various details of the machine.
Fig. 8 is an enlarged section on the line 8—8 of Fig. 7.

Nevertheless, real advantages are gained by use of a deflecting baffle of the type shown at A to direct excess articles toward the periphery of the rotary table. A suitable baffle of this kind can be normally stationary, and if desired it may be constructed to provide for adjustments. The baffle A herein shown comprises a set collar 34 (Figures 1, 3, 6 and 9) secured to the central stationary post 14 by means of a set screw 35. A curved inner baffle section 36 is secured to the set collar 34 by means of screws 37 (Figures 3 and 6), and provided with a rib or spline 38 at one side. The baffle A also includes a curved outer section 39 extending from the inner section 36, said outer section 39 having a central slot 40 (Fig. 8) to receive the spline 38 on said inner section 36. The curved outer baffle section 39 is slidable along the inner section 36 to locate the outer extremity of the baffle A in various positions with relation to the periphery of the rotary table. After making the desired adjustment, these baffle sections can be rigidly united by means of a bolt 41 and clamping nut 42, as shown in Figures 7 and 8.

It will be observed that the central set collar 34 is adjustable around the stationary post 14 to locate the baffle A in various selected positions around the axis of the rotary table. Furthermore, the set collar 34 with the baffle A attached thereto can be removed from the central post 14 and replaced on said post in an inverted position. This will reverse the curvature of said baffle A with relation to the rotary table, a condition which becomes desirable when the table is to be rotated in a direction opposite to that shown by a feathered arrow in Fig. 1. For example, such reversal would become desirable when a paricular installation of the transferring device involves an arrangement of the inlet and outlet passages which require a reversal in the rotation of the table.

Figures 2, 3:
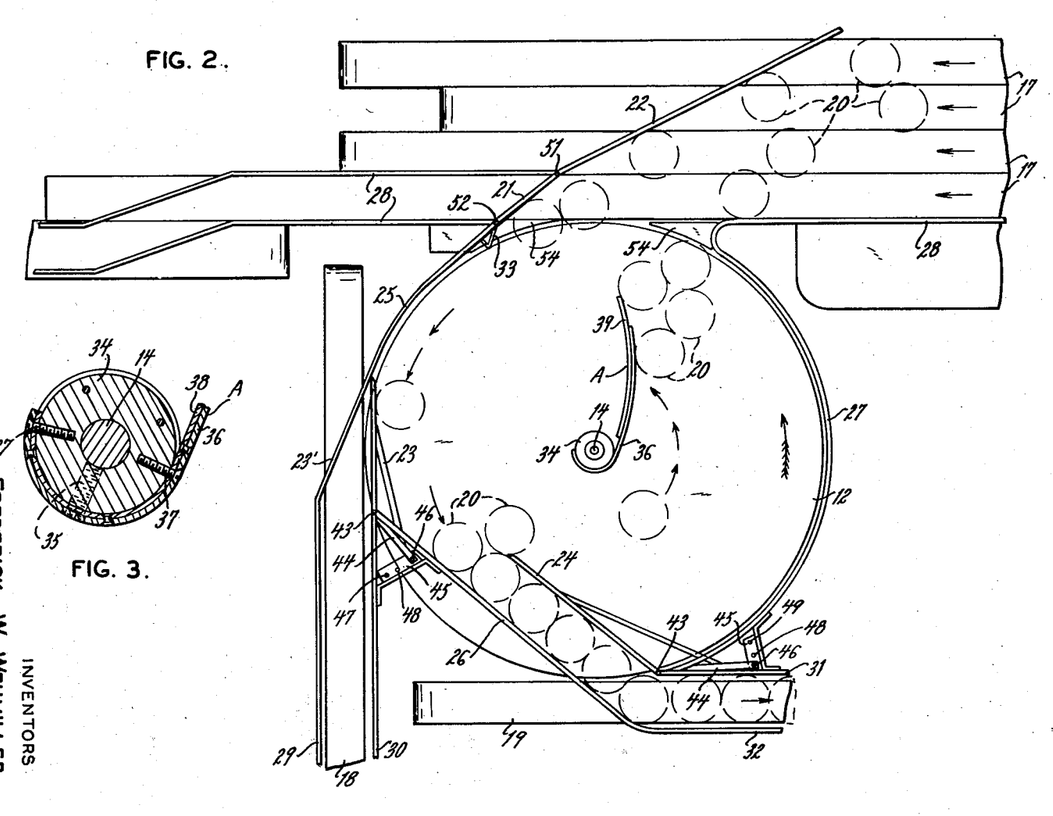
Fig. 2 is a similar diagram wherein one of the outlets is closed, and deflecting baffle devices are set for relatively large articles.
Fig. 3 is a horizontal section on the line 3—3 of Fig. 6, showing an attachment for the returning deflector.
Figures 4, 5, 6:
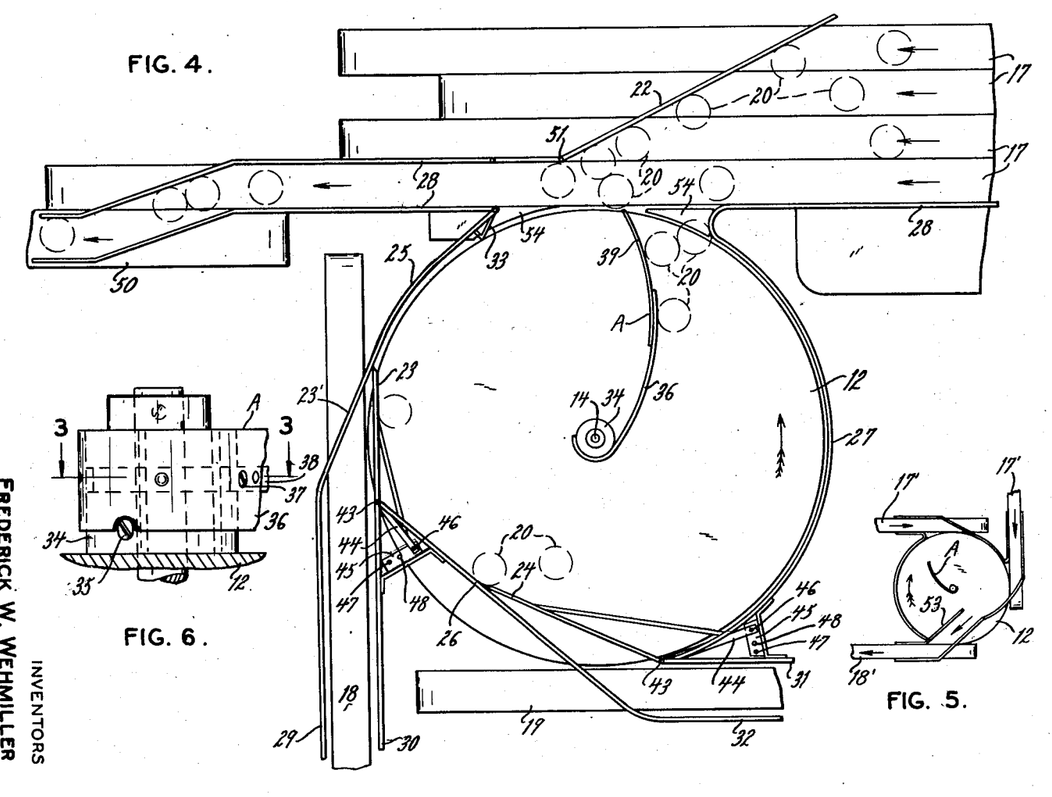
Fig. 4 diagrammatically illustrates conditions wherein the table is adapted to receive excess articles from a stream which normally travels at one side of said table. Under such conditions, the excess articles may travel with the table and return to the traveling side stream, or one of the outlet gates may be opened to separately discharge the excess articles.
Fig. 5 is a diagram, drawn to a reduced scale, showing conditions wherein the rotary table has two inlets for separate incoming streams of articles, and a single outlet for the combined streams.
Fig. 6 is an enlarged fragmentary section on the line 6—6 in Fig. 7.
Figure 11:
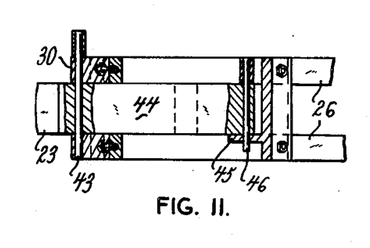
Fig. 11 is an enlarged section taken approximately on the line 11—11 in Fig. 7, showing portions of an adjustable outlet gate.

We will now refer to additional novel features which enable any one or all of the outlet passages to be conveniently closed, or adjusted for different widths in handling articles of different diameters. As shown most clearly in Figures 7 and 11, each of the outlet baffles 23 and 24 is pivotally connected to a vertical pin 43 and provided with a locking arm 44 extending over a stationary keeper 45. The free end of each locking arm 44 is provided with a slidable locking pin 46 adapted to be inserted into any one of a series of holes 47, 48 and 49 formed in a stationary keeper 45. The deflecting baffles 23 and 24 thus appear in the form of gates adapted to be locked in selected positions by means of the locking pins 46 and the stationary keepers. In Fig. 1 these baffle gates 23 and 24 are locked in intermediate positions to provide discharge passages of a width desired for traveling articles 20 having a diameter suggested by dotted lines in Fig. 1. In Fig. 2 the baffle gate 24 is open a little wider to receive larger articles, and secured by means of its locking pin 46, while the gate 3 is locked in a closed position. Fig. 4 shows both of the baffle gates 23 and 24 locked in closed positions.

In Fig. 2 there is only one outgoing stream of traveling articles, which is discharged through the outlet passage at the open baffle gate 24 to the traveling conveyor 19 whereby the articles are carried away at a predetermined rate per minute. Excess articles will overflow from the entrance of said open outlet passage and travel with the rotary table, as previously described, to the returning baffle A where they are deflected toward the periphery of the table for return travel to the outlet passage at the baffle 24. Since the articles in Fig. 2 are relatively large, the slidable section 39 of the returning baffle A may be adjusted to provide a relatively large space between the outer end of said baffle and the periphery of the table.

Fig. 4 illustrates a manner in which the apparatus can be set to carry a stream of articles on an elongated supply conveyor element 17 to a delivery conveyor 50. In this illustration the inlet baffle 21 is removed, so that the stream of articles will normally pass the inlet of the rotary table. However, under abnormal conditions, when an excessive supply of articles are rather forcibly crowded together on said traveling conveyor 17, excess articles will be free to escape through said inlet and pass onto the rotary table where they may accumulate and eventually pass through a suitable outlet. In Fig. 4, the returning baffle A is extended to a point near said conveyor 17, so as to return the excess articles to said conveyor. However, if desired, one of the outlet gates 23 or 24 could be opened to provide for free escape of these excess articles.

Figure 9:
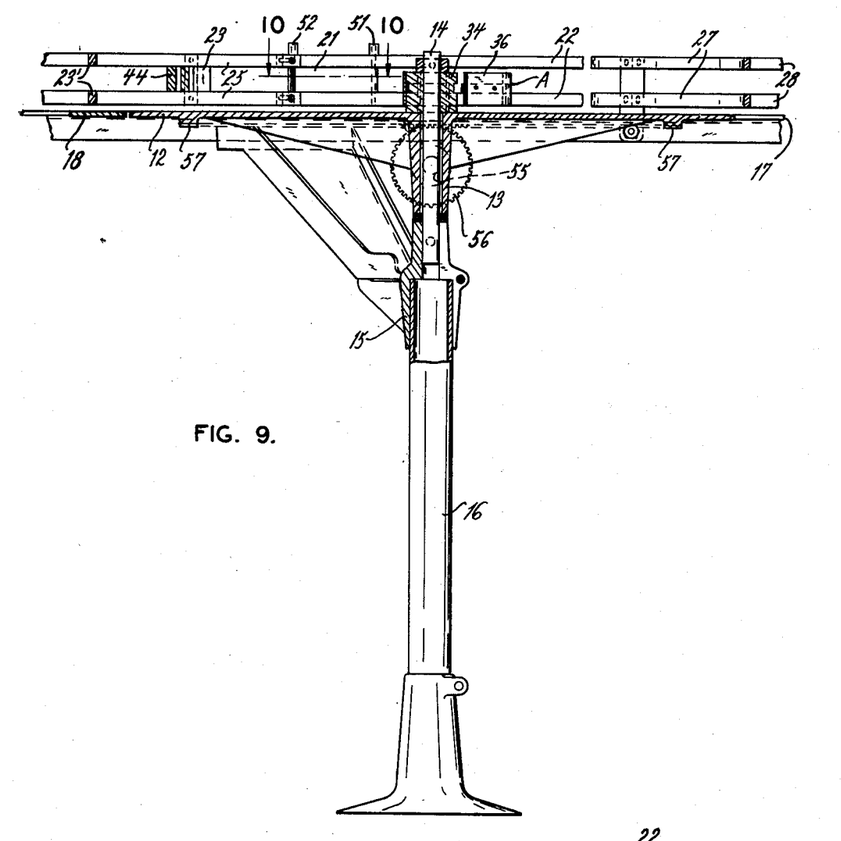
Fig. 9 is a section taken approximately on the line 9—9 of Fig. 8.
Figure 10:
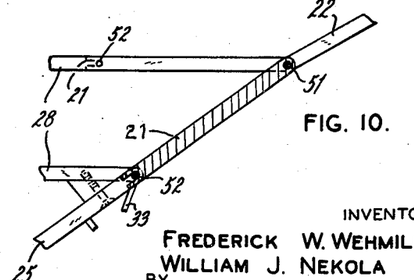
Fig. 10 is an enlarged horizontal section on the line 10—10 of Fig. 9, showing a baffle gate near the inlet of the rotary table.

The removable inlet baffle 21 may be detachably secured by means of vertical pins 51 and 52, as shown most clearly in Figures 7, 9 and 10. The pin 51 is adapted to serve as a pivot on which the baffle 21 can swing from a closed position where it is locked by the pin 52 (Fig. 10), to an open position where it can be again locked by the pin 52.

Fig. 5 is a small diagram showing conditions wherein there are two supply conveyors 17' leading to separate peripheral inlets of the rotary table 12, and a single delivery conveyor 18' leading from a single discharge baffle 53. In this illustration, two incoming streams of articles can be combined to form a single outgoing stream on the delivery conveyor 18', which may carry away the articles at a predetermined rate, as previously described in referring to Figures 1 and 2. Excess articles overflowing at the discharge baffle 53 (Fig. 5) will continue to travel with the rotary table 12 and pass to the returning baffle A whereby they are deflected toward the periphery of said table for future delivery to the discharge baffle 53 and conveyor 18'.

In various views, near the inlet of the rotary table, we have shown stationary filler members 54 having top faces approximately flush with the top faces of the table and conveyor elements 17. These fillers 54 provide for free transfer of articles between the table and the supply conveyor 17.

While any suitable means may be employed to rotate the table 12 at any desired speed, in Figures 7 and 9 we have shown a drive shaft 55 provided with a pinion 56 meshing with a circular row of teeth 57 at the bottom of the rotary table.

We claim:

1. In a device for transferring a continual stream of traveling articles, a rotary table having a peripheral inlet to receive the traveling articles and a plurality of peripheral outlets to discharge said articles, the articles being loosely seated upon and carried by the rotary table from said inlet to the plurality of peripheral outlets, a traveling supply conveyor leading to said inlet, traveling delivery conveyors located in separate paths leading from said peripheral outlets to provide for distribution of the traveling articles, a deflecting baffle extending over said rotary table to direct some of the traveling articles from the first outlet to one of the delivery conveyors, said first outlet being intermittently clogged by articles selected for its delivery conveyor and a second deflecting baffle extending over said table to direct articles overflowing from said first outlet to the delivery conveyor at a second outlet, the inlet end of said second baffle being more remote from the periphery of said table than the inlet end of the baffle for the first outlet.

2. In a device for transferring a continual stream of traveling articles, an accumulator comprising a rotary table having a peripheral inlet to receive the traveling articles and a plurality of peripheral outlets to discharge said articles, the articles being loosely seated upon and carried by the rotary table from said inlet to the plurality of peripheral outlets, a traveling supply conveyor located in a path leading to said inlet, traveling delivery conveyors located in separate paths leading from said peripheral outlets to provide for distribution of the traveling articles, a deflecting baffle extending over said rotary table at the first outlet to direct some of the traveling articles from said first outlet to one of the delivery conveyors, said first outlet being intermittently closed by articles selected for its delivery conveyor, a second deflecting baffle extending over said table at a second outlet to direct articles overrunning said first outlet to the delivery conveyor at the second outlet, the inlet end of said second baffle being more remote from the periphery of said table than the inlet end of the baffle for the first outlet, excess articles overrunning the plurality of outlets being free to accumulate on the rotary table, and a normally stationary returning baffle located above said rotary table in a line directed toward the periphery thereof, so as to deflect and return excess articles from the outlets to a zone near said peripheral inlet.

3. In a device for transferring a continual stream of traveling articles, an accumulator comprising a rotary table having a peripheral inlet to receive the traveling articles and a plurality of peripheral outlets to discharge said articles, the articles being loosely seated upon and carried by the rotary table from said inlet to the plurality of peripheral outlets, a traveling supply conveyor leading to said inlet, traveling delivery conveyors located in separate paths leading from said peripheral outlets to provide for distribution of the traveling articles, a deflecting baffle gate extending over said rotary table to direct some of the traveling articles from the first outlet to one of the delivery conveyors, a second deflecting baffle gate extending over said table to direct articles overflowing from said first outlet to the delivery conveyor at a second outlet, the inlet end of said second baffle gate being more remote from the periphery of said table than the inlet end of the baffle gate for the first outlet, each of the outlets being clogged at times with articles selected for its delivery conveyor excess articles overflowing from the plurality of outlets being free to accumulate on the rotary table, and a returning baffle located above said rotary table in a line directed toward the periphery thereof, so as to deflect and return excess articles from the outlets to a zone near the periphery of the rotary table, each of said baffle gates being movable to open and close its outlet from the rotary table.

4. In a device for transferring a continual stream of traveling articles, an accumulator comprising a rotary table having a peripheral inlet to receive the traveling articles and a plurality of peripheral outlets to discharge said articles, the articles being loosely seated upon and carried by the rotary table from said inlet to the plurality of peripheral outlets, a traveling supply conveyor located in a path adjacent to said inlet, the incoming articles being loosely seated upon said supply conveyor, and the top of said conveyor being approximately flush with the top of said rotary table, an inclined deflector located above said supply conveyor to deflect the stream of loose articles into said peripheral inlet, traveling delivery conveyors located in separate paths adjacent to and approximately flush with said peripheral outlets to provide for distribution of the loose traveling articles, a deflecting baffle gate extending over said rotary table at the first outlet to direct some of the traveling articles from said first outlet to one of the delivery conveyors, a second deflecting baffle gate extending over said table at a second outlet to direct articles overrunning said first outlet to the delivery conveyor at said second outlet, the inlet end of said second baffle gate being more remote from the periphery of said table than the inlet end of the baffle gate for the first outlet, excess articles overrunning the plurality of outlets being free to accumulate on the rotary table, and a returning baffle located above said rotary table in a line directed toward the periphery thereof, so as to deflect and return excess articles from the outlets to a zone near said peripheral inlet, each of said baffle gates being movable to open and close its outlet from the rotary table, and also adjustable to vary the width of its outlet for articles of different diameters, and means for fastening the baffle gates in positions to which they are adjusted.

5. In a device for transferring traveling articles, an accumulator comprising a rotary table having a peripheral inlet to receive the traveling articles and a peripheral outlet to discharge said articles, the articles being loosely seated upon and carried by the rotary table from said inlet to said outlet, deflectors extending from said inlet and outlet to deflect the loose articles onto and away from said rotary table, the deflector at said inlet being provided with a projecting cam to direct incoming articles away from crowded articles in advance of the cam, excess articles being free to accumulate on said rotary table, and a deflector located above said rotary table to deflect excess articles toward the periphery of the table.

6. In a device for transferring traveling articles, a rotary table having a peripheral inlet to receive the traveling articles, a traveling conveyor located adjacent to said peripheral inlet, the articles being loosely supported on said traveling conveyor, and the top of said conveyor being approximately flush with the top of said rotary table, an inlet baffle extending over said traveling conveyor near said inlet to deflect the loose articles onto said table, said inlet baffle being movable to permit the articles to normally continue in motion with said conveyor instead of passing into said inlet, excess articles crowded on said conveyor being then free to pass through said inlet and onto the rotary table, and a returning baffle located above said table in a line directed toward said traveling conveyor, so as to deflect and return said excess articles to said conveyor.

7. In a device for selectively distributing loose articles to a plurality of machines in accordance with the operating speeds of said machines, a substantially horizontal rotary table having a peripheral inlet for the articles and a plurality of peripheral outlets for selective discharge of the articles to the respective machines, the articles being loosely supported on and carried by the rotary table from said inlet to said outlets, said loose articles being movable with the table from the first peripheral outlet to a second peripheral outlet when the first outlet is closed by preceding articles, separate feeding means leading from said peripheral outlets to remove selected articles from the course of said rotary table, excess articles overflowing from said second peripheral outlet being movable with the rotary table, and a returning baffle located above said rotary table in a line directed toward the periphery thereof, so as to deflect and return excess articles from said second outlet to the peripheral zone of said first peripheral outlet.

8. In a device for selectively distributing loose articles to a plurality of receiving machines in accordance with the operating speeds of said machines, a substantially horizontal rotary table having a peripheral inlet for the articles and a plurality of peripheral outlets for selective discharge of the articles to the respective machines, the articles being loosely supported on and carried by the rotary table from said inlet to said outlets, said loose articles being movable with the table from the first peripheral outlet to a second peripheral outlet when the first outlet is clogged by preceding articles, separate selective feeding means leading from said peripheral outlets to remove selected articles for said peripheral outlets at rates conforming to the operating speeds of the receiving machines, each of said peripheral outlets being clogged at times by articles selected for delivery to a receiving machine, and a returning baffle extending over said table to direct excess articles to the peripheral zone of said first peripheral outlet.

9. In a device for selectively distributing loose articles at different rates per minute to a plurality of receiving machines in accordance with different operating speeds of said machines, a substantially horizontal rotary table having a peripheral inlet for the articles and a plurality of peripheral outlets for selective discharge of the articles to the respective machines, the articles being loosely supported on and carried by the rotary table from said inlet to said outlets, said loose articles being movable with the table from the first peripheral outlet to a second peripheral outlet when the first outlet is clogged by preceding articles, separate selective feeding means leading from said peripheral outlets to remove selected articles from said peripheral outlets at the different rates conforming to the different operating speeds of the respective receiving machines, each of said peripheral outlets being clogged at times by articles selected for delivery to a receiving machine, and a deflector located above said rotary table to direct excess articles to the peripheral zone of said first outlet.

10. In a device for selectively transferring loose traveling articles to a receiving machine in accordance with the operating speed of said machine, a rotary table having an inlet for the articles and a peripheral outlet for selective discharge of the articles from said table, a selective feeder leading from said peripheral outlet to remove articles from the table at a rate conforming to the speed of said receiving machine, said outlet being clogged at times by articles selected for delivery to said receiving machine, said rotary table having a supplemental peripheral outlet for the discharge of articles passing the first mentioned peripheral outlet when it is clogged by preceding articles, and a conveyor leading from said supplemental peripheral outlet to an area beyond said rotary table, the loose articles entering at said inlet being free to move with the rotary table to the first mentioned peripheral outlet, and thence to said supplemental peripheral outlet when the first outlet is clogged.

11. In a device for selectively transferring loose traveling articles to a receiving machine in accordance with the demands of said machine, a rotary table having an inlet for the articles and a peripheral outlet for selective discharge of the articles from said table, a selective feeder leading from said peripheral outlet to remove articles from the table at a rate conforming to the demands of said receiving machine, said selective feeder comprising a delivery conveyor adapted to slip across bottom faces of the loose articles so as to prevent excessive delivery of articles from said peripheral outlet, said outlet being clogged at times by articles selected for delivery to said receiving machine, said rotary table having a supplemental peripheral outlet for the discharge of articles passing the first mentioned peripheral outlet when it is clogged by preceding articles, and means for directing articles away from said supplemental peripheral outlet to an area beyond said rotary table, the loose articles entering at said inlet being free to move with the rotary table to the first mentioned peripheral outlet, and thence to said supplemental peripheral outlet when the first outlet is clogged.

12. In a device for selectively transferring loose traveling articles to a receiving machine in accordance with the demands of said machine, a rotary table having an inlet for the articles and a peripheral outlet for selective discharge of the articles from said table, a selective feeder leading from said peripheral outlet to remove articles from the table at a rate conforming to the demands of said receiving machine, said outlet being intermittently clogged by articles selected for delivery to said receiving machine, said rotary table having a supplemental peripheral outlet for the discharge of articles passing the first mentioned peripheral outlet when it is clogged by preceding articles, means for directing articles away from said supplemental peripheral outlet to an area beyond said rotary table, the loose articles entering at said inlet being free to move with the rotary table to the first mentioned peripheral outlet, and thence to said supplemental peripheral outlet when the first outlet is clogged, and an adjustable gate movable to close one of said peripheral outlets, the loose articles on the table being free to pass said gate without entering the clogged outlet.

13. In a device for selectively transferring loose traveling articles to a receiving machine in accordance with the demands of said machine, a rotary table having an inlet for the articles and a peripheral outlet for selective discharge of the articles from said table, a selective feeder leading from said peripheral outlet to remove articles from the table at a rate conforming to the demands of said receiving machine, said selective feeder comprising a delivery conveyor adapted to slip across bottom faces of the loose articles so as to prevent excessive delivery of articles from said peripheral outlet, said outlet being intermittently clogged by articles selected for delivery to said receiving machine, said rotary table having a supplemental peripheral outlet for the discharge of articles passing the first mentioned peripheral outlet when it is clogged by preceding articles, and means for directing articles away from said supplemental peripheral outlet to an area beyond said rotary table, the loose articles entering at said inlet being free to move with the rotary table to the first mentioned peripheral outlet, and thence to said supplemental peripheral outlet when the first outlet is clogged, each of said peripheral outlets being provided with a baffle gate movable to a closed position so as to prevent discharge of articles through the closed outlet, the loose articles on the table being free to pass said gate while moving to an open peripheral outlet.

14. In a device for selectively distributing loose articles to a plurality of machines in accordance with the operating speeds of said machines, a substantially horizontal rotary table having a peripheral inlet for the articles to be distributed and a plurality of peripheral outlets for selectitve discharge of the articles for distribution to the respective machines, said loose articles initially being movable by said rotary table toward said peripheral outlets for discharge therethrough, whereby said table is normally clear of excess articles, separate selective feeding conveyors adjacent said peripheral outlets and the path of movement of said table to remove from said table the quantity of selected articles crowded by table rotation through said outlets and movable by said feeding conveyors at rates conforming to the operating speeds of the receiving machines, stoppage of a receiving machine clogging the associated peripheral outlet by articles selected for distribution to the latter machine and forcing subsequent articles to pass the clogged outlet, and a returning baffle located in a position extending over said table beyond the last in turn of said peripheral outlets to direct articles toward the periphery of said table to mingle in the flow of articles entering said table at said inlet.

15. In a device for distributing loose articles to a plurality of receiving machines in accordance with the operating speeds of the machines, a substantially horizontal rotary table having a peripheral inlet for the articles to be distributed and a plurality of peripheral outlets through which the articles pass from said rotary table to the respective machines, article deflecting members located over said table in position to define said peripheral outlets, the articles being loosely supported on and carried by said rotary table from said inlet toward said outlets for distribution by said deflecting members through said outlets, separate distribution conveying means leading from said rotary table to remove articles normally crowded from said table by rotary movement thereof and entering said outlets from the course of said rotary table, articles escaping distribution through said peripheral outlets by said deflecting members being movable with said rotary table beyond said peripheral outlets, and a returning baffle located above said rotary table in an angularly fixed position directed toward the table periphery, so as to deflect articles escaping distribution at said peripheral outlets toward the table periphery to return the articles for subsequent passes at said outlets.

16. In a device for selectively distributing loose articles at different rates per minute to a plurality of receiving machines in accordance with different operating speeds of said machines, a substantially horizontal rotary table having a peripheral inlet for the articles and a plurality of peripheral outlets located beyond said inlet for selective discharge of the articles to the respective machines, said articles being carried by said table toward said inlets and crowded therethrough for delivery movement from the table at the different rates conforming to the different operating speeds of the respective receiving machines, articles forced by previous articles clogging one or more of said outlets, to overrun all of said outlets continuing movement with said table, separate selective feeding conveyors located adjacent the path of movement of the periphery of said rotary table for receiving and leading from said peripheral outlets the selected articles to be delivered thereby to the receiving machines at the different rates conforming to the different operating speeds of the respective receiving machines, and a deflector located above said rotary table in the path of movement of the articles to divert the articles overrunning said outlets radially outwardly toward the periphery of said table.

FREDERICK W. WEHMILLER.
WILLIAM J. NEKOLA.

References Cited in the file of this patent

UNITED STATES PATENTS

| Number | Name | Date |
| --- | --- | --- |
| 1,110,983 | Ayars | Sept. 15, 1914 |
| 1,263,146 | Taliaferro | Apr. 16, 1918 |
| 1,740,893 | Hoyt | Dec. 24, 1929 |
| 1,811,908 | De Back | June 30, 1931 |
| 2,068,146 | Medcalf | Jan. 19, 1937 |
| 2,338,348 | Newman | Jan. 4, 1944 |
| 2,423,441 | Dennie | July 8, 1947 |
| 2,585,559 | Lakso | Feb. 12, 1952 |

FOREIGN PATENTS

| Number | Country | Date |
| --- | --- | --- |
| 374,133 | Great Britain | June 6, 1932 |
| 498,085 | Germany | May 17, 1930 |